United States Patent
Roman

(10) Patent No.: US 6,468,016 B1
(45) Date of Patent: Oct. 22, 2002

(54) METHOD FOR TEMPORARY STORAGE OF ENDLESS, INTERMEDIATE ARTICLES OF MANUFACTURE

(75) Inventor: John Patrick Roman, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/491,060

(22) Filed: Jan. 25, 2000

(51) Int. Cl.$^7$ ................................................ B65G 1/00
(52) U.S. Cl. .................. 414/331.06; 414/312; 414/813; 156/403
(58) Field of Search ............................... 414/198, 312, 414/331.01–331.06; 152/539; 156/403

(56) References Cited

U.S. PATENT DOCUMENTS

| | | | | |
|---|---|---|---|---|
| 2,576,107 A | * | 11/1951 | Davis et al. ................. | 198/158 |
| 4,018,325 A | * | 4/1977 | Rejsa ........................... | 198/347 |
| 4,358,170 A | * | 11/1982 | Eberle et al. ............... | 312/268 |
| 4,614,268 A | * | 9/1986 | Chlebina et al. ............ | 206/304 |
| 4,656,817 A | * | 4/1987 | Keady et al. ................ | 53/520 |
| 4,683,020 A | * | 7/1987 | Portalupi et al. ............ | 156/403 |
| 4,798,281 A | | 1/1989 | Egger .......................... | 198/698 |
| 4,815,673 A | | 3/1989 | Wheeler ..................... | 242/7.09 |
| 5,024,576 A | | 6/1991 | Meschi ........................ | 414/786 |
| 5,088,872 A | | 2/1992 | Asawa et al. ................ | 414/352 |
| 5,244,330 A | * | 9/1993 | Tonjes ......................... | 414/331 |
| 5,397,209 A | | 3/1995 | Heim .......................... | 414/349 |
| 5,562,400 A | | 10/1996 | Travis ..................... | 414/745.3 |
| 5,584,477 A | | 12/1996 | Sakai .......................... | 271/198 |

* cited by examiner

*Primary Examiner*—Kathy Matecki
*Assistant Examiner*—Charles A. Fox
(74) *Attorney, Agent, or Firm*—Nancy T. Krawczyk

(57) ABSTRACT

A method for temporarily storing a plurality of endless, intermediate articles of manufacture being characterized by: (i) placing an endless, intermediate article of manufacture in a load/unload position on the storage device 10; (ii) indexing the article out of the load/unload position and into a storage position; and (iii) repeating these steps with additional articles. In the preferred method, the step of indexing the article into a storage position being further characterized by the steps of: (i) detecting the presence of the article in the load/unload position; (ii) moving the article away from the load/unload position; and (iii) stopping the article when the presence of the article in the load/unload position is no longer detected.

9 Claims, 4 Drawing Sheets

METHOD FOR TEMPORARY STORAGE OF ENDLESS, INTERMEDIATE ARTICLES OF MANUFACTURE

TECHNICAL FIELD

This invention relates to a method for temporarily storing a plurality of endless, intermediate articles of manufacture and, more particularly, to temporarily storing a plurality of pneumatic tire beads.

BACKGROUND ART

A pneumatic tire generally contains at least two beads. A bead is an annular tensile member associated with holding the tire to the wheel rim. After a bead is formed on a bead former, the bead is removed from the former and must be stored until it is built into a tire. Ideally, the device that stores the bead can store a plurality of beads and can be used for transporting the beads to the location in the plant where the beads are to be built into a tire.

Currently, several devices are available for storing and transporting tire beads. The first device has horizontally extending pins for supporting a plurality of beads. The beads hang vertically from the pins. Although this device can store and transport a large number of beads, the use of this device may cause deformation to the beads being stored on it. First, since the beads are hung vertically with support only at the location of the pin, the beads tend to elongate and warp as they hang on the pin. These deformations of the beads cause non-uniformity of the tires built with these elongated and/or warped beads. Another problem caused by the use of this device is that automated removal of the beads from the device is difficult. Since the beads are free hanging, automatic removal of the beads requires complex and expensive sensors to detect the exact location of the bead on the pin. Additionally, since some of the beads may stick together on the same pin, separating the beads may cause additional deformities.

A second device used in the storage and transport of beads is the molded, reusable separator, sometimes referred to as a "tophat" due to its shape. To move a plurality of beads, a plurality of molded, reusable separators must be used. Each separator has a horizontal lip area that extends radially outwardly from the base of a taller crown area. Each bead is placed on the separator so that the crown area of the separator is in the center of the bead and the bead rests on the horizontal lip area. After a bead is placed on a separator, a second separator is placed on top of the first separator. The separators become connected in the crown area such that the lip areas of the separators are vertically separated from each other. A second bead is placed on the second separator and the process is continued. Since each separator is sized specifically for a particular bead size, a large inventory of separators is necessary for each different bead size. Since the separators are relatively large, storing the necessary number of separators takes a lot of storage space. Additionally, handling of the separators is difficult due to their bulkiness.

U.S. Pat. No. 4,614,268 entitled "BEAD TRANSPORTING CONTAINER" discloses another device for storing and transporting beads. This container stores the beads in a vertical position and spaces the beads with separating ribs. The beads are supported by the sidewalls of the container. Each sidewall has a radius of curvature similar to that of the beads.

SUMMARY OF THE INVENTION

This invention provides a method for temporarily storing a plurality of endless, intermediate articles of manufacture.

The method is characterized by: (i) placing an endless, intermediate article of manufacture into a load/unload position on a storage device having a plurality of index mechanisms, each index mechanism having a plurality of positions for storage of the articles, the positions being serially movable into or out of the load/unload position; (ii) indexing the article out of the load/unload position and into a storage position; and (iii) repeating these steps with additional articles until a desired number of articles are placed on the storage device.

In the preferred method, the step of indexing the article into a storage position is further characterized by the steps of: (i) detecting the presence of the article in the load/unload position; (ii) moving the article away from the load/unload position; and (iii) stopping the article when the presence of the article in the load/unload position is no longer detected.

The method may further include the steps of: (i) indexing an article out of a storage position and into the load/unload position; and (ii) removing the article from the load/unload position.

BRIEF DESCRIPTION OF DRAWINGS

The invention will be described by way of example and with reference to the accompanying drawings in which.

DETAILED DESCRIPTION OF THE INVENTION

Figure 1:
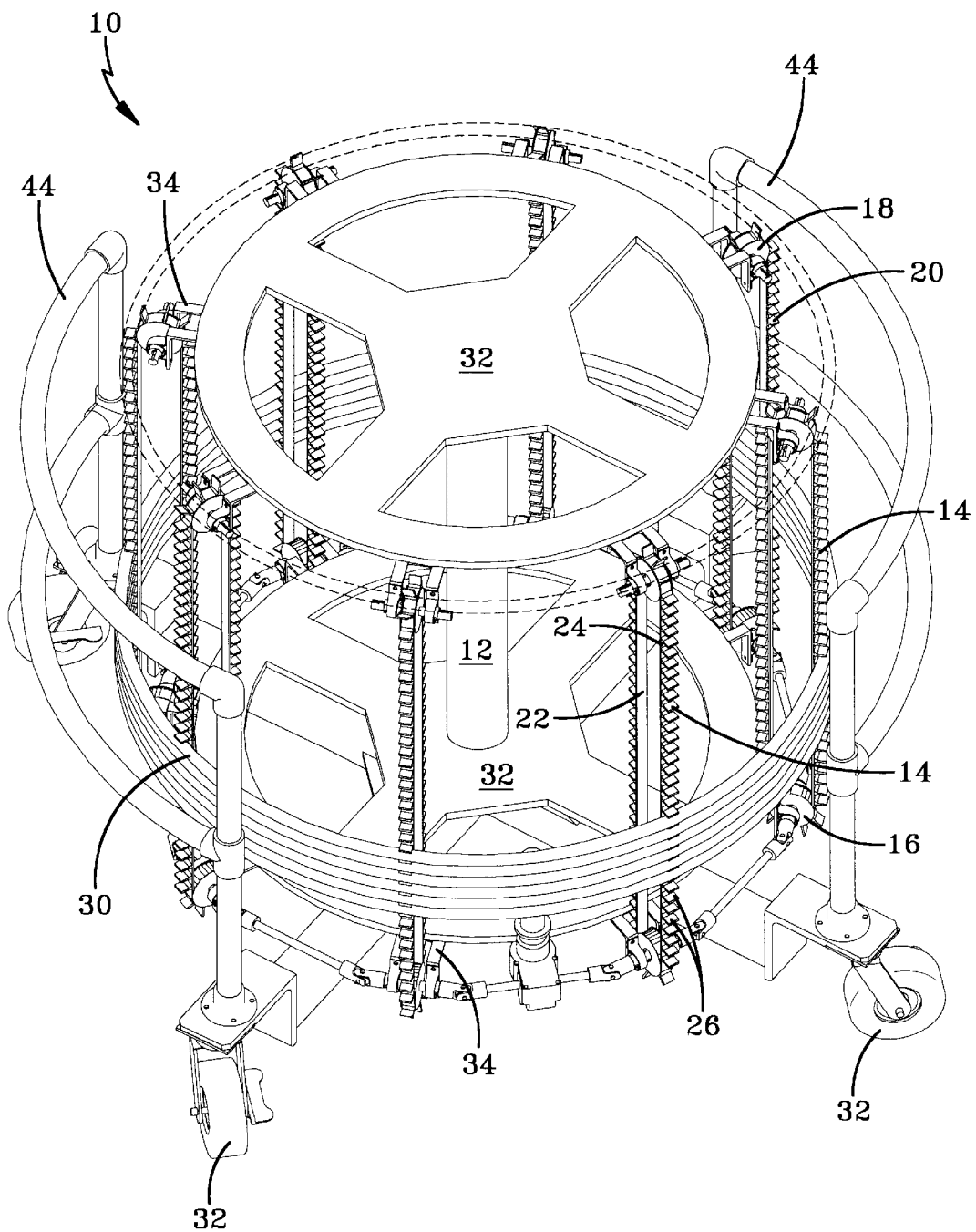
FIG. 1 is a view of a storage device for endless, intermediate articles of manufacture on which the method of the invention can be performed.

FIG. 1 shows a view of a storage device 10 for endless, intermediate articles of manufacture on which the method of the invention may be performed. An endless, intermediate article of manufacture is an endless component or subassembly that will be combined with other components or subassemblies to form a final product. Endless refers to the article having no distinct beginning or ending, such as a ring or hoop. An example of an endless, intermediate article of manufacture is a pneumatic tire bead 30, as illustrated. As can be seen in FIG. 1, the storage device 10 has a frame 12 that supports a plurality of index mechanisms 14. Each index mechanism 14 has a first pulley 16, a second pulley 18, and a positive-drive belt 20 that is mounted between the respective pulleys 16, 18. The positive-drive belt 20 has an interior surface 22 and an exterior surface 24. The interior surface 22 contains timing lugs that interact with grooves in the surface of each pulley 16,18. The exterior surface 24 of the positive-drive belt 20 has a plurality of protrusions 26 that extend from the exterior surface 24 for supporting a respective bead 30.

Figure 2:
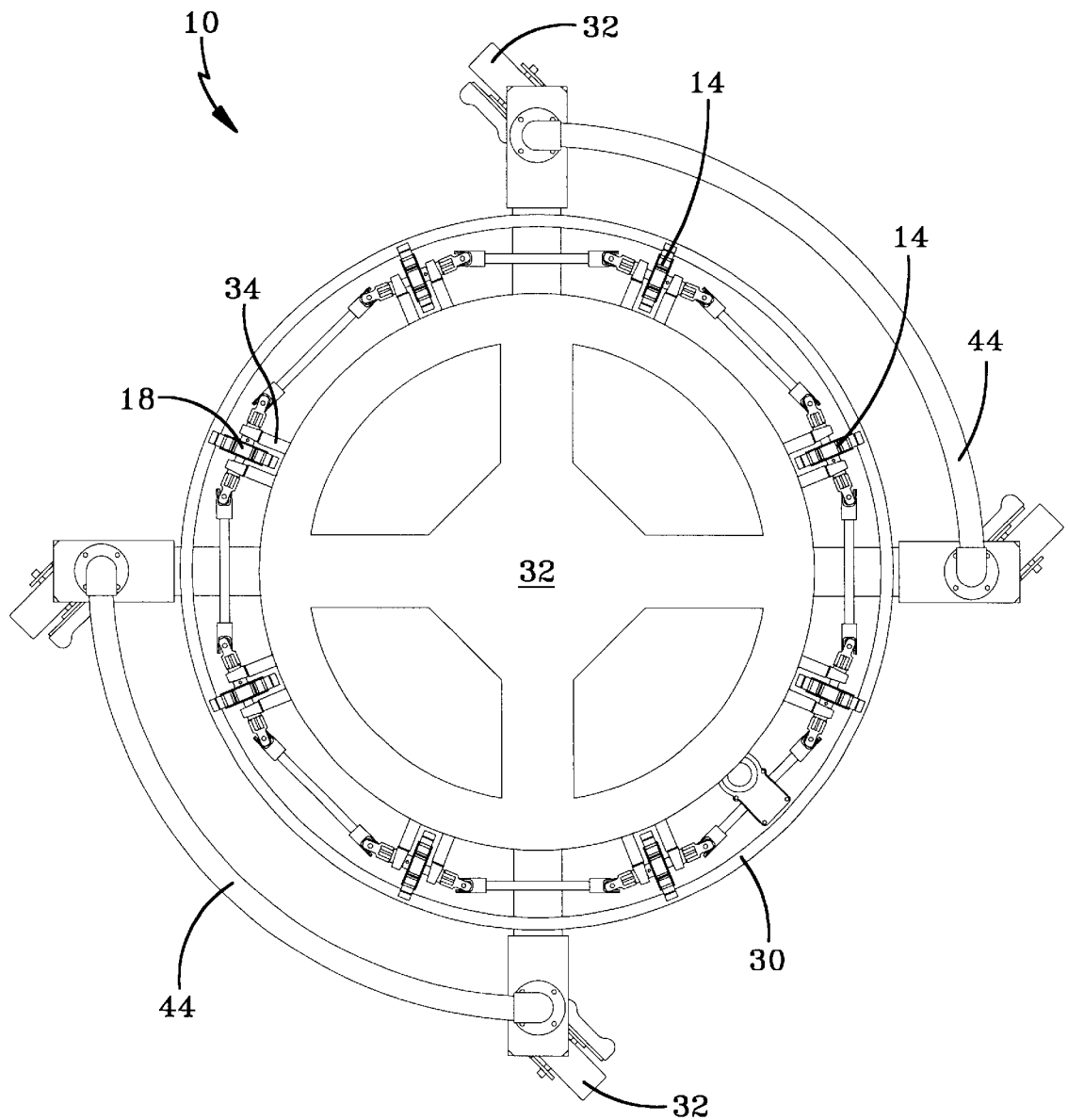
FIG. 2 is a top view of the storage device of FIG. 1.

Although only beads 30 of one size may be stored on the device 10 at a given time, the device 10 is adaptable for storing other bead sizes. As seen in FIGS. 1 and 2, the device 10 has at least two mounting plates 32 that are supported by the frame 12. One mounting plate 32 is located near the first pulley 16 of each index mechanism 14. A bracket 34 is affixed to the mounting plate 32 and the first pulley 16 is mounted upon this bracket 34. A second mounting plate 32 is located near the second pulley 18 of each index mechanism 14. Another bracket 34 is affixed to this mounting plate 32 and the second pulley 18 is mounted upon this bracket 34. The respective mounting plates 32 are sized for a range of bead sizes. The larger the bead diameter, the larger the size of each mounting plate 32. Although the shape of each mounting plate 32 may vary, ideally each mounting plate 32 will be circular. The index mechanisms 14 are also adjustable upon their respective brackets 34. This adjustment is made by loosening the index mechanisms 14 on the respective brackets 34 and sliding them to the desired position on the bracket 34. This adjustment is usually limited to a few bead sizes but allows the device 10 to accept a range of bead 30 sizes without requiring a change of the mounting plates 32.

Each index mechanism 14 has a load/unload position and a plurality of storage positions. Each respective position is defined by a protrusion 26 on the exterior of the positive-drive belt. The load/unload position is located near the second pulley 18 and is the first protrusion that the endless, intermediate article of manufacture rests on when placed on the storage device 10. The load/unload position is depicted by the dashed line bead on FIG. 1 and FIG. 4. The storage position is any position on the storage device 10 where an endless, intermediate article of manufacture may be stored so that no portion of the bead extends into the load/unload position or can be detected in the load/unload position. The positions of each index mechanism 14 are serially movable into or out of the load/unload position.

An endless, intermediate article of manufacture, such as a bead 30, is placed on the device 10 so that it lies in the load/unload position. The article is supported by one of the respective protrusions 26 from the positive-drive belt 20 of each index mechanism 14. After an article is placed on the device 10 at the load/unload position, the detection means of a control system detects the presence of the article in the load/unload position and cues the respective index mechanisms 14 to index or move the article out of the load/unload position. The respective index mechanisms 14 can be used to move the article a fixed distance away from the load/unload position or can stop the article when its presence is no longer detected in the load/unload position. This movement makes other protrusions 26 available at the load/unload position to receive another article. The detection means used by the control system may be a photo eye, a limit switch, or any other means for detecting the presence or lack of presence of the article in the load/unload position.

The device 10 is used to temporarily store a plurality of endless, intermediate articles of manufacture prior to their being built into a final product. An article is loaded onto the device 10 by placing the article, such as a bead 30, in the load/unload position on the device 10, indexing the article out of the load/unload position and into a storage position, and repeating these steps with additional articles until a desired number of articles are placed on the storage device 10. The device 10 may be loaded with articles until it is manually stopped or until a second detection means located near the first pulley 16 of the index mechanisms 14 detects the presence of an article indicating that the device 10 is completely loaded. When the device 10 is completely loaded, the control system prevents the further indexing of the articles away from the load/unload position.

To unload the articles from the device 10, a switch located on the control system is positioned in an unload position. This reverses the direction of movement of the respective index mechanisms 14, as compared to when the device 10 is being loaded. The control system indexes the respective index mechanisms 14 toward the load/unload position until an article is positioned in the load/unload position. The detection means of the control system determines the presence of the article in the load/unload position. After the article is removed from the load/unload position, either automatically or manually, the detection means indicates to the control system the lack of the presence of an article in the load/unload position. The control system then cues the index mechanisms 14 to index an article out of a storage position and into the load/unload position. The indexing of the article into the load/unload position can be done by moving the article a fixed distance toward the load unload position and detecting the article in the load/unload position, or by detecting the lack of presence of an article in the load/unload position, moving an article toward the load/unload position, and stopping the article when the presence of the article in the load/unload position is detected. This method can be repeated until it is manually stopped or until the device 10 no longer contains any articles.

Figure 3:
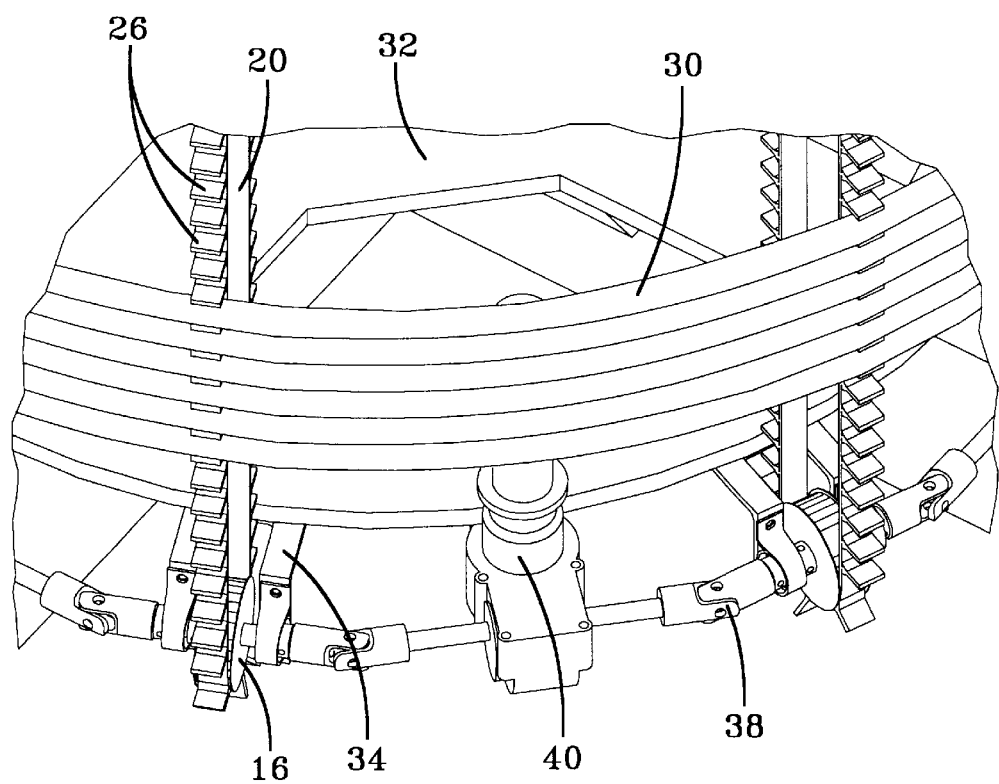
FIG. 3 is detailed view of a portion of the storage device of FIG. 1 near the first pulley of the respective index mechanisms.

FIG. 3 is a detailed view of a portion of the device 10 near the first pulley 16 of the respective index mechanisms 14. As shown, the first pulley 16 is mounted upon a bracket 34 that is affixed to a mounting plate 32. The mounting plate 32 and the bracket 34 are not required as the first pulley 16 can be directly attached to the frame 12. However, in order to make the device 10 adjustable for different bead 30 sizes, the mounting plates 32 and brackets 34 are used. FIG. 3 also shows the use of a connecting shaft 38 that connects the first pulley 16 of each index mechanism 14. The use of this connecting shaft 38 allows each index mechanism 14 to move at the same speed as the other index mechanisms 14, keeping the respective beads 30 parallel to one another at all times. The use of the connecting shaft 38 enables a single drive mechanism 40 to drive all of the index mechanisms 14. Although the device 10 can be used without a connecting shaft 38, such use would require multiple drive mechanisms 40 and a much more complex control system to control the timing of each index mechanism 14. The drive mechanism 40 can be electrically, pneumatically, hydraulically, manually or spring operated. Ideally, the drive mechanism is pneumatically operated with limit switches used as the detection means for the control system.

Figure 4:
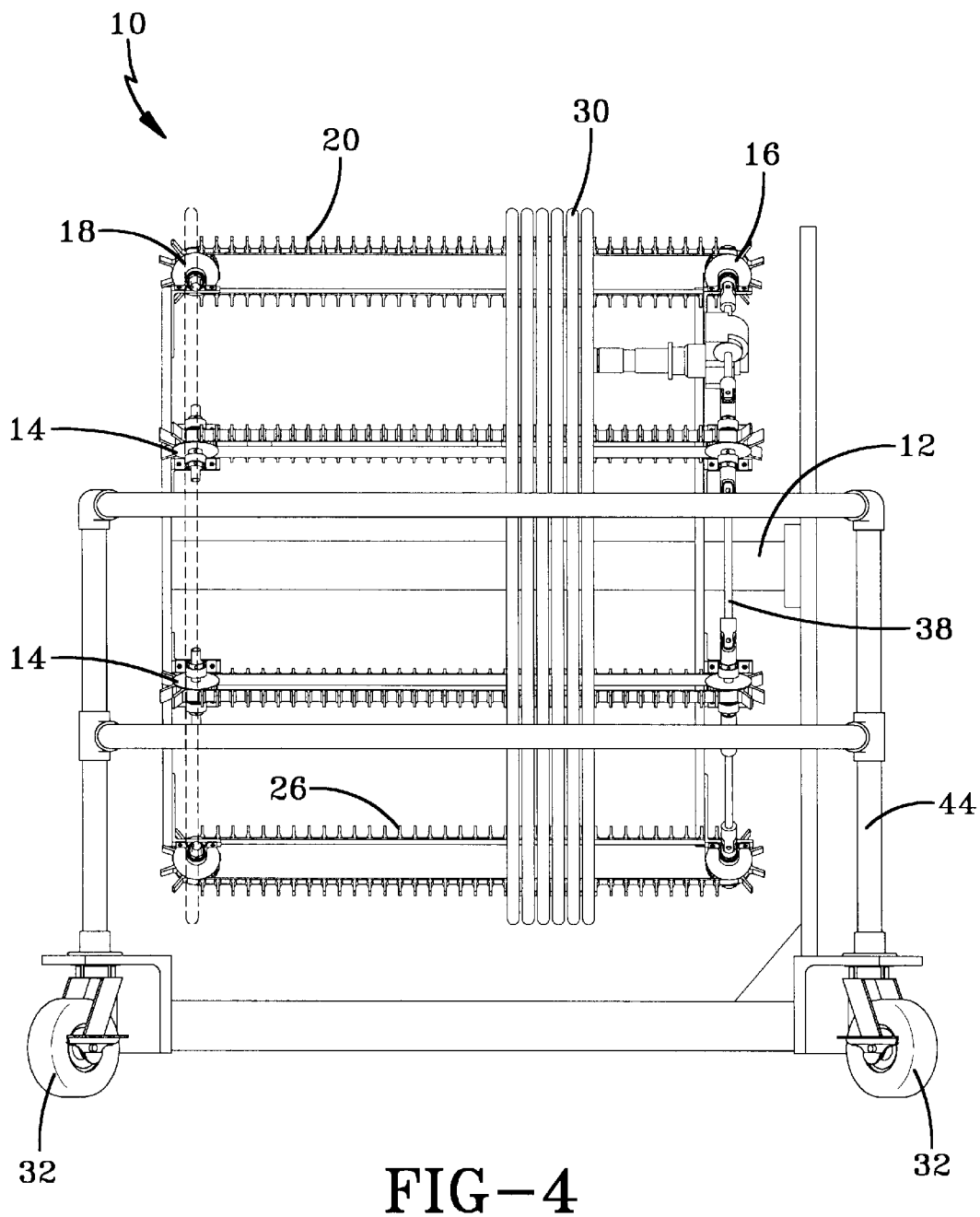
FIG. 4 is a second embodiment of a storage device for endless, intermediate articles of manufacture on which the method of the invention can be performed.

FIG. 4 shows an embodiment of the device 10 where the index mechanisms 14 move horizontally such that the respective articles are stored and transported in a vertical position. In this embodiment, the device 10 can be modified so that loading and unloading can take place at opposite ends of the device 10. Such modification would involve changing the location of the frame 12 and most likely supporting the articles from an outside diameter. Additionally, the device 10 can be designed to be able to tilt between the vertical position shown in FIG. 1 and the horizontal position shown in FIG. 4. Thus, the device 10 may be loaded while in the vertical position and then tilted, changing the orientation of the index mechanisms 14, to the horizontal position prior to unloading, or vice versa.

The number of index mechanisms 14 can be adjusted depending upon the size of the beads 30 to be stored. Ideally, a device 10 will have a sufficient number of index mechanisms 14 to properly support the bead 30. Proper support prevents the beads 30 from warping or deforming while being stored and transported. Thus, the larger the bead diameter, the more likely additional index mechanisms 14 will be required to properly support the beads 30. Additionally, the spacing between respective protrusions 26 can be varied to accept beads 30 with larger widths or with attached apexes. The index mechanisms 14 may also be placed to support the respective beads 30 by their outside diameter, as opposed to the inside diameter as depicted.

In order to make the storage device 10 easily movable throughout a manufacturing plant, the frame 12 can be mounted on a plurality of casters 32 or can be mounted on rails having cutouts that are accessible by a forklift or similar device. Multiple devices may be placed on one platform. This platform may have devices for different size beads or multiple devices for one size bead. The second pulleys 18 should have a diameter sufficiently small enough to allow the protrusions 26 located near the load/unload position to move out of the way of a respective bead 30 being placed on the device 10. The device 10 can also be provided with safety rails 44 to prevent human access into the area of the index mechanisms 14.

The device 10 can be used to properly support a plurality of endless, intermediate articles of manufacture, such as pneumatic tire beads 30, such that deformations caused during the storage and transportation of the respective articles can be eliminated. The device 10 also provides for the loading and the unloading of each article at a set location on the device 10, called the load/unload position, allowing for ease of automation for loading and unloading the articles.

What is claimed is:

1. A method for temporarily storing a plurality of endless, intermediate articles of manufacture, the method being characterized by the steps of:
    (i) placing an endless, intermediate article of manufacture into a load/unload position of a fixed diameter storage device having a plurality of index mechanisms, each index mechanism having a plurality of positions for storage of the articles, the positions being serially movable into or out of the load/unload position;
    (ii) indexing the article out of the load/unload position and into a storage position;
    (iii) repeating these steps with additional articles until a desired number of articles are placed on the fixed diameter storage device; and
    (iv) storing the desired number of articles on the fixed diameter storage device.

2. The method of claim 1, the method further including the step of:
    (i) preventing further indexing of the articles when the storage device becomes completely loaded.

3. The method of claim 1, the step of indexing the article into a storage position being further characterized by the step of:
    (i) detecting the presence of the article in the load/unload position; and
    (ii) moving the article a fixed distance away from the load/unload position.

4. The method of claim 1, the step of indexing the article into a storage position being further characterized by the steps of:
    (1) detecting the presence of the article in the load/unload position;
    (2) moving the article away from the load/unload position; and
    (3) stopping movement of the article when the presence of the article in the load/unload position is no longer detected and the article is in the storage position.

5. The method of claim 1, the method further including the steps of:
    (i) indexing an article out of a storage position and into the load/unload position; and
    (ii) removing the article from the load/unload position.

6. The method of claim 5, the step of indexing an article out of a storage position and into the load/unload position being further characterized by the step of:
    (i) moving the article a fixed distance toward the load/unload position; and
    (ii) detecting the presence of the article in the load/unload position.

7. The method of claim 5, the step of indexing an article out of a storage position and into the load/unload position being further characterized by the steps of:
    (i) detecting the lack of presence of an article in the load/unload position;
    (ii) moving the article toward the load/unload position; and
    (iii) stopping the article when the presence of the article in the load/unload position is detected.

8. The method of claim 5, the method further including the step of:
    (i) changing the orientation of the index mechanisms prior to removal of the article from the load/unload position.

9. A storage device for storing a plurality of endless articles, the storage device comprising:
    a frame having mounting plates at each end of the frame;
    a plurality of index mechanisms mounted about the radially outer edge of the mounting plates, the index mechanisms each having a first and a second end and a plurality of discrete and distinct storage positions between the first and second ends;
    connecting shafts extending between one of the ends of the index mechanisms to synchronize the movement of the plurality of index mechanisms together and maintain the alignment between the storage positions of the index mechanism; and
    a drive mechanism for indexing the index mechanism.

* * * * *